W. W. WHEELER.
ROTARY ENGINE.
APPLICATION FILED OCT. 12, 1909.
945,067. Patented Jan. 4, 1910.
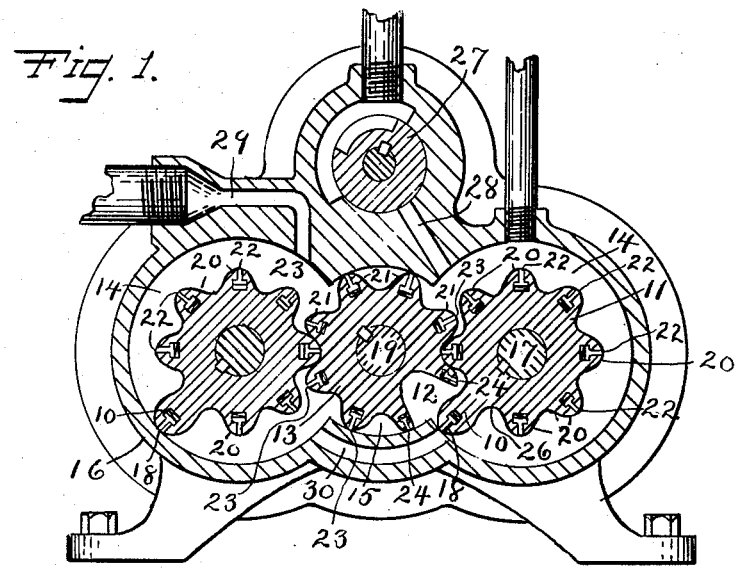
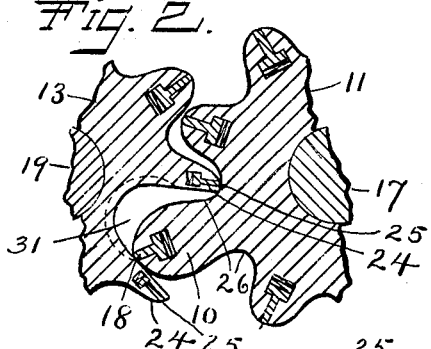
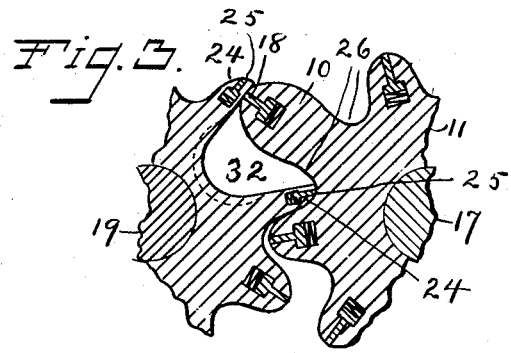
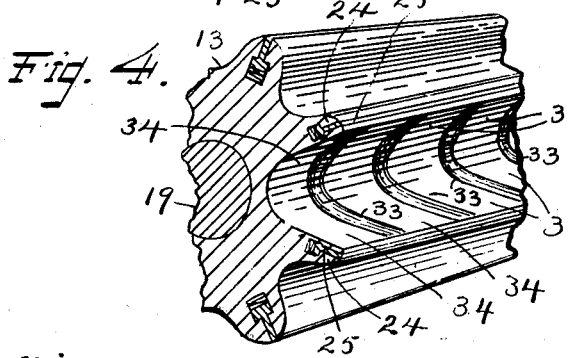
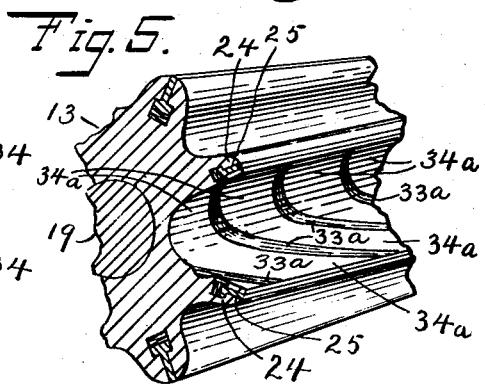
Witnesses:
S. H. Clark
N. L. Lockwood
Inventor.
William W. Wheeler.
By Louis M. Schmidt
Atty.

UNITED STATES PATENT OFFICE.

WILLIAM W. WHEELER, OF MERIDEN, CONNECTICUT.

ROTARY ENGINE.

945,067.

Specification of Letters Patent.

Patented Jan. 4, 1910.

Application filed October 12, 1909. Serial No. 522,346.

*To all whom it may concern:*

Be it known that I, WILLIAM W. WHEELER, a citizen of the United States, residing at Meriden, in the county of New Haven and State of Connecticut, have invented certain new and useful Improvements in Rotary Engines, of which the following is a specification.

My invention relates to improvements in rotary engines and the objects of my improvements are reduction in internal losses and improvement in efficiency of operation.

In the accompanying drawings:—Figure 1 is a sectional view of a rotary engine embodying my invention. Fig. 2 is a similar view of a fragmentary part of the same on an enlarged scale, with the moving parts in a different relative position from that shown in Fig. 1. Fig. 3 is a similar view showing the moving parts in still a different relative position. Fig. 4 is a perspective view of a portion of a rotary abutment embodying my improvement. Fig. 5 is a similar view of a modification of my rotary abutment.

My invention is adapted to be applied to the type of engines having a rotary piston 10 consisting of an extended tooth mounted on a hub 11 adapted to operate in conjunction with a recess 12 in a rotary abutment 13. The engine shown in Fig. 1 is a compound engine having two such rotary pistons 10 one on each side of a single rotary abutment 13, the said pistons operating each in a cylinder 14 and the rotary abutment 13 in an abutment chamber 15, the said cylinders and abutment chamber contained in a single body 16. The said hub 11 is mounted on a shaft 17 or may be made integral with the same so that when rotated the said piston 10 will sweep through the space of the said cylinder 14, so that the outer end of the piston will bear against the inner cylindrical wall of the same, longitudinal packing strips 18 being provided for the purpose of insuring steam tight operation. The said rotary abutment 13 is mounted on a shaft 19 or made integral therewith and is a fit for the abutment chamber 15. As shown the said piston 10 is an especially long tooth in a series of teeth on the said hub 11, the other shorter teeth 20 of the series being adapted to mesh and operate in conjunction with corresponding teeth 21 on the rotary abutment 13, longitudinal packing strips 22 and 23 respectively on the short teeth 20 and 21 insuring steam tight operation of the same.

The said recess 12 is walled in by special teeth 24 provided with special packing strips 25 to insure steam tight operation in conjunction with the walls of the recess 26 adjacent the piston teeth 10. Accordingly provision is made for steam tight operation throughout the complete cycle of operations of the coacting teeth and the intervening spaces and recesses of the rotary pistons and abutment. Further features of the engine shown in the drawing comprise a supply cut off valve 27, a supply port 28 opening into the right hand cylinder 14 as shown in Fig. 1, an exhaust port 29 opening out from the left hand cylinder 14, and an interconnecting port 30 interconnecting the two cylinders 14, 14. As stated the teeth and intervening spaces of the piston and abutment are adapted for steam tight operation, and furthermore they are adapted to make steam tight connection with one another at all points where they come into abutment with one another.

In Fig. 2 the rotary piston 10 is shown as having just entered the recess 12, the outer end of the piston being in abutment with the lower special tooth 24. An inspection of the said figure shows the upper special tooth 24 to be in abutment with the upper of the recesses 26 adjacent the piston tooth 10. Accordingly there is a space 31 between the said piston tooth 10 and the back walls of the said recess 12 that is shut off from the exterior cylinder space 14, in which steam will be pocketed, and which steam without special provision for obviating the same, would be compressed with the continued operation involving the piston 10 entering farther into and eventually essentially filling the space of the recess 12. Assuming the steam to have been forced out of the said space with further continuance of operations the position shown in Fig. 3 will be attained and which is essentially the reverse of that shown in Fig. 2, in that the end of the piston tooth 10 is in contact with the upper of the said special teeth 24 and the lower of the said special teeth 24 is in abutment with the wall of the lower of the said recesses 26 adjacent the piston tooth 10, and in which case the space 32 is shut off from the general cylinder space 14. In this case, without such special provision the said space 32 would be a vacuum, and would represent suction resistance, whereas the said space 31 represents cushioning or pressure resistance, and both involve loss of power and reduction in efficiency of operation. These losses are obviated by my invention in the following manner. The lateral and back walls of the recess 12 are provided with open releasing grooves 33, extending circumferentially generally from adjacent the end of one special tooth 24 to the other, providing accordingly steam passage ways or ports through which steam may travel around the end of the piston tooth 10 at positions intermediate to those shown in Figs. 2 and 3. The general wall surface 34 of the said recess 12 on each side of the said ports 33 is given the usual conformation suitable for the combined sliding and rolling interaction of the same with the piston 10.

In the modification shown in Fig. 5 the releasing grooves 33$^a$ are given a helical formation so that the intervening wall surface 34$^a$ may better serve as a bearing surface for the outer end of the piston 10 without any tendency to wear grooves in the said piston end. The engine to which my invention is shown as being applied has internal coacting teeth, but the same may be applied to engines provided with external gears for interconnecting the piston and abutment or to any engine having a projecting piston tooth 10 operating in a recess 12 in the abutment, whether single acting or compound. It will be noted that when the piston 10 is in position in the recess 12 there is a balancing of steam pressure on each side of the piston 10 so that the connecting of the said spaces 31 and 32 with either side of the said piston 10 has no effect, either detrimental or otherwise on the steam conditions in the cylinder space 14.

By my invention rotary engines of the types described may be constructed with coacting teeth and recesses having an essentially perfect fit, without any lost motion or back lash whatsoever, and without detrimental leakage or seepage of motive fluid and at the same time avoiding the losses of power and impaired efficiency due to cushioning and suction between the piston tooth and the back walls of the recess provided for the same in the manner described.

My invention may be applied to rotary engines employing either steam, or explosive mixture or other motive fluid as a motive power, including water power.

I claim as my invention:—

1. In a rotary engine having a piston and abutment provided with internal coacting teeth, an extended tooth on said piston hub adapted to operate as a piston, and a recess in said abutment having walls and adapted to operatively receive said piston, a series of grooves in said walls of said recess adapted to permit the passage of steam from between the said piston and the said recess and the general exterior cylinder space.

2. In a rotary engine, a rotary abutment having a recess adapted to operatively receive a rotary piston, the said recess having walls provided with a recess extending circumferentially generally from one extreme to the other of the said walls.

3. In a rotary engine, a rotary abutment provided with a recess adapted to operatively receive a rotary piston, the interior periphery of said recess provided with a releasing groove helical in formation and extending essentially from the extreme outer limit of said recess on one side to the corresponding limit on the other side.

4. In a rotary engine having a hub provided with a series of teeth, one of said teeth extended and adapted to operate as a piston, a rotary abutment having teeth and recesses between the teeth, adapted to coact with the said teeth on said hub and comprising a special recess adapted to operatively receive the said piston tooth, means for preventing leakage and seepage of motive fluid involving a tight fit of the coacting parts, and means for preventing pocketing of motive fluid by said piston tooth and for preventing suction resistance to said piston tooth in its coaction with said special recess.

WILLIAM W. WHEELER.

Witnesses:
SHEFFIELD H. CLARKE,
NEWTON L. LOCKWOOD.